US006843606B2

(12) United States Patent
Deane et al.

(10) Patent No.: US 6,843,606 B2
(45) Date of Patent: Jan. 18, 2005

(54) MULTI-FORMAT CONNECTOR MODULE INCORPORATING CHIP MOUNTED OPTICAL SUB-ASSEMBLY

(75) Inventors: Peter Deane, Los Altos, CA (US); Euan P. Livingston, San Jose, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 10/392,802

(22) Filed: Mar. 19, 2003

(65) Prior Publication Data

US 2003/0180012 A1 Sep. 25, 2003

Related U.S. Application Data

(63) Continuation-in-part of application No. 09/713,367, filed on Nov. 14, 2000, now Pat. No. 6,497,518.
(60) Provisional application No. 60/429,751, filed on Nov. 27, 2002.

(51) Int. Cl.[7] .................................................. G02B 6/36
(52) U.S. Cl. .............................. 385/92; 385/88; 385/94
(58) Field of Search ............................. 385/88, 92, 94, 385/89, 90, 91, 49

(56) References Cited

U.S. PATENT DOCUMENTS

| 3,950,075 | A | * | 4/1976 | Cook et al. .................... 385/93 |
| 4,179,801 | A | * | 12/1979 | Hollis ........................... 29/828 |
| 5,428,704 | A | * | 6/1995 | Lebby et al. ................... 385/92 |
| 5,452,387 | A | * | 9/1995 | Chun et al. .................... 385/88 |
| 5,515,467 | A | * | 5/1996 | Webb ............................ 385/88 |
| 5,917,976 | A |   | 6/1999 | Yamaguchi .................... 385/88 |
| 6,364,542 | B1 |   | 4/2002 | Deane et al. .................. 385/92 |
| 6,497,518 | B1 |   | 12/2002 | Deane ........................... 385/92 |
| 6,595,699 | B1 | * | 7/2003 | Nguyen et al. ................ 385/88 |
| 6,655,854 | B1 | * | 12/2003 | Nguyen et al. ................ 385/88 |

OTHER PUBLICATIONS

U.S. patent application No. 09/568,558, entitled: "Arrayable, Scaleable, and Stackable Molded Pckage Configuration", filed: May 9, 2000, inventors: Nguyen et al.

(List continued on next page.)

*Primary Examiner*—Chau N. Nguyen
(74) *Attorney, Agent, or Firm*—Beyer Weaver & Thomas LLP

(57) ABSTRACT

Embodiments of the invention include an optical connector module (OCM) electrically and optically connecting an integrated opto-electric assembly to standard format electrical and optical connectors. The OCM includes a module body that houses an integrated opto-electric assembly and provides electrical and optical connection to existing formats. The integrated opto-electric assembly comprising an optical sub-assembly (OSA) and chip sub-assembly (CSA) that are electrically connected to each other and configured as a single opto-electric component. The OCM includes an optical interface suitable for receiving an optical ferrule and configured to enable optical communication between optical fibers of the ferrule and the OSA. Additionally, the OCM includes an electrical interface suitable for electrically connecting the CSA to a standard format electrical connector. The OCM is configured such that it is compatible with optical ferrule formats and electrically compatible with electrical formats. The embodiments of the invention further include methods for electrically and optically interconnecting an integrated opto-electric assembly with standard format optical and electrical connectors.

25 Claims, 6 Drawing Sheets

OTHER PUBLICATIONS

U.S. patent application No. 09/922,357, entitled: "Optoelectronic Package with Dam Structure to Provide Fiber Stand-off", filed: Aug. 3, 2001, inventors: Nguyen et al.

U.S. patent application No. 09/922,358, entitled: "Miniature Semiconductor Package for Opto-electronic Devices", filed: Aug. 3, 2001, inventors: Nguyen et al.

U.S. patent application No. 09/922,598, entitled: "Techniques for Joining an Opto-electronic Module to a Semiconductor Package", filed: Sep. 4, 2001, inventors: Nguyen et al.

U.S. patent application No. 09/963,039, entitled: "Techniques for Attaching Rotated Photonic Devices to an Optical Sub-assembly in an Optoelectronic Package", filed: Sep. 24, 2001, inventors: Nguyen et al.

U.S. patent application No. 10/165,553, entitled: "Optical Sub-assembly for Optoelectronic Modules", filed: Jun. 6, 2002, inventors: Mazotti et al.

U.S. patent application No. 10/165,711, entitled: "Ceramic Optical Sub-assembly for Optoelectronic Modules", filed: Jun. 6, 2002, inventors: Liu et al.

* cited by examiner

MULTI-FORMAT CONNECTOR MODULE INCORPORATING CHIP MOUNTED OPTICAL SUB-ASSEMBLY

CROSS-REFERENCE TO RELATED APPLICATIONS

This application is a continuation-in-part application to U.S. patent application Ser. No. 09/713,367, entitled "Miniature Opto-Electric Transceiver" by Peter Deane, filed on Nov. 14, 2000, now US. Pat. No. 6,497,518 which claims benefit 60/429,751 file Nov. 27, 2002.

This application further claims priority to U.S. Provisional Patent Application No. 60/429,751, entitled "Multi-Format Connector Module Incorporating Chip Mounted Optical Sub-Assembly" by Peter Deane, filed on Nov. 27, 2002.

This application is also related to the following U.S. patent documents:

U.S. patent application Ser. No. 09/568,094, entitled "Device And Method For Providing A True Semiconductor Die To External Fiber Optic Cable Connection," by Deane et al., filed on May 9, 2000 issued on Apr. 2, 2002 as U.S. Pat. No. 6,364,542.

U.S. patent application Ser. No. 09/568,558, entitled "Arrayable, Scalable And Stackable Molded Package Configuration," by Nguyen et al., filed on May 9, 2000;

U.S. patent application Ser. No. 09/922,358, entitled "Miniature Semiconductor Package For Opto-Electronic Devices," by Nguyen et al., filed on Aug. 3, 2001;

U.S. patent application Ser. No. 09/922,598, entitled "Techniques For Joining An Opto-Electronic Module To A Semiconductor Package," by Nguyen et al., filed on Aug. 3, 2001;

U.S. patent application Ser. No. 09/922,357, entitled "Optoelectronic Package With Dam Structure to Provide Fiber Standoff", by Nguyen et al., filed on Aug. 3, 2001;

U.S. patent application Ser. No. 10/165,553, entitled "Optical Sub-Assembly for Opto-Electronic Modules", by Mazotti, et al., filed on Jun. 6, 2002;

U.S. patent application Ser. No. 10/165,711, entitled "Ceramic Optical Sub-Assembly For Opto-Electronic Modules", by Liu et al., filed on Nov. 20, 2001; and to U.S. patent application Ser. No. 09/963,039, entitled: "Techniques For Attaching Rotated Photonic Devices To An Optical Sub-Assembly In An Optoelectronic Package", by Nguyen et al., filed on Sep. 24, 2001, the content of each of which are hereby incorporated by reference.

FIELD OF THE INVENTION

The embodiments of the invention described herein relate electro-optical coupling. In particular, the embodiments of the invention relate to methodologies and apparatus containing an opto-electric assembly comprising an integrated optical sub-assembly (OSA) and chip sub-assembly (CSA) that is capable of optical coupling to an industry standard format optical ferrule and electrically connecting to an industry standard electrical connection.

BACKGROUND OF THE INVENTION

Due to increasing needs for bandwidth, modern computer and communication networks are placing increasing reliance on optical signal transmission through fiber optic cabling. While fiber optic cabling is very efficient for transferring data, such light signals cannot, as yet, be effectively used to process data. Therefore, many existing networks use fiber optics for transmitting data between nodes and silicon chips for processing the data electronically within the nodes.

Electro-optic circuitry, such as fiber optic transceivers, which convert light signals from a fiber optic cable into electrical signals, and vice versa, are used as the interface between a fiber optic line and a computer node. A typical transceiver includes a substrate and one or more electro-optic (also referred to as opto-electronic) semiconductor devices mounted on the substrate. These electro-optic semiconductor devices can include optical detectors for converting light signals received over the fiber optic cables into electrical signals or optical emitters for converting electrical signals from the semiconductor devices into light signals. Such electro-optic devices are referred to herein as photonic devices. Typical examples of photonic devices include, but are not limited to optical emitters (which can include LED's, side emitting lasers, VCSEL's or other laser devices) and optical receivers. These photonic devices can be incorporating into a varying array of optical transmitter, receiver, and transceiver implementations. Such devices are widely available in a variety of standard formats. For example, a number of fiber optic transceivers are commercially available from Hewlett Packard, AMP, Sumitomo, Nortel, and Siemens.

In one common implementation, photonic device emitters and transmitters are mounted in "TO" can packages, which form part of emitter, receiver, and transceiver implementations. "TO" can packages are can-shaped cylindrical housings (constructed in accordance with the industry standard "TO" sizes specification) that can contain electro-optic devices such as are available from a wide variety of manufacturers. Examples of standard TO can package sizes include, but are not limited to TO-3, TO-5, TO-18, TO-39, TO-46, TO-52, TO-72, and TO-99. "TO" can packaged devices are large, bulky, roughly cylindrical devices constructed to be compatible with standard format MSA (multi-source agreement) optical modules. In one standard implementation, two "TO" can packaged devices are soldered to electrical connections on a standard PCB (printed circuit board). In a transceiver implementation, one "TO" can package includes a transmitter (laser) and another "TO" can package includes a receiver optical device. The PCB includes a plethora of non-integrated sub-systems and separate components that are electrically connected to facilitate optical to electrical conversion and vice versa. The sub-systems and separate components are also connected to "back end" electrical connectors of the PCB that can be plugged into compatibly formatted plug receptacles on other electrical components (e.g., computers, routers, switches, and/or other compatible components). Alternatively, the back end electrical connectors of the PCB are formatted as solderable connections that are soldered to other compatibly formatted electrical components (e.g., computers, routers, switches, and/or other compatible components).

FIG. 1 illustrates a figurative cross-section view of one conventional optical module implementation configured in compliance with an SFP format. A connector jacket 103 encloses a TO can package 101 that is wired to a PCB 105 having a plurality of components 107 thereon. The back end 108 of the PCB is depicted in the pluggable format having electrical contacts (also referred to as edge connectors) spaced, sized, and positioned for plugging into a compatible receptacle.

Commonly, the optical and electronic components are arranged in a module jacket to facilitate the easy interconnection of the optical and electronic components with the optical fibers. In common usage, the TO can pakages are arranged relative to a connector apparatus in a specified configuration which is in accord with one of a number of standard configurations. Such configurations are referred to herein as connector formats or, alternatively, just formats. By the TO can packages of a module in accord with one of the common formats, optical fibers configured in accordance with the same format can be interconnected to the TO cans of the module. Such optical modules are commonly arranged in formats complying with one of a plurality of standard connector formats. Commonly, the fibers are held by ferrules which facilitate easy interconnection with compatible modules. The ferrules can be configured to hold single fibers or configured to hold an array of fibers bundled together in the ferrule in accordance with a number of standard formats. For example, in one implementation a parallel array of 12 fibers bundled together in a common ferrule. Among the problems with such systems is that the large size of TO can packages limits the miniaturization possible in such modules.

As described above, National Semiconductor has developed a family of integrated opto-electric assemblies for interconnecting optical fibers to electrical devices. Some examples of such assemblies are described in detail in U.S. patent application Ser. No. 09/713,367, entitled "Miniature Opto-Electric Transceiver," by Peter Deane, filed on Nov. 14, 2000; U.S. patent application Ser. No. 09/922,358, entitled "Miniature Semiconductor Package For Opto-Electronic Devices," by Nguyen et al., filed on Aug. 3, 2001; and U.S. patent application Ser. No. 09/922,598, entitled "Techniques For Joining An Opto-Electronic Module To A Semiconductor Package," by Nguyen et al., filed on Aug. 3, 2001 each of which are incorporated by reference herein. These and similar opto-electric assemblies have the capacity to replace the large TO can packages and PCB's used in conventional implementations. The integrated opto-electric assemblies are more reliable and have the capacity to include a much high circuit density than is possible using the TO can package and PCB combinations of the prior art. The integrated opto-electric assemblies of the present invention are also much smaller that the TO can packages and PCB's of the prior art.

FIG. 2 illustrates the size disparity between opto-electric assemblies 201 of the type described above and standard format SFF module 202 constructed using TO can packaged devices (not shown) and PCB 203. Although this degree of miniaturization is extremely advantageous, in many implementations it presents some integration difficulties with respect to existing formats. If used without adaptation, the depicted opto-electric assemblies cannot be used to implement many of the existing standard connector formats. Simply put, the small size and miniaturized format of such opto-electric assemblies 201 make them incompatible with many existing standard format modules. As a result, there is a need for an optical connector module (OCM) that can harmonize the integrated opto-electric assemblies 201 with existing connector formats. Such an OCM should be able to electrically and optically interface an integrated opto-electric assembly (including an integrated optical sub-assembly (OSA) and chip sub-assembly (CSA)) with a plurality of existing connector formats. It would be further advantageous, if for example, the OCM can interface the integrated opto-electric assembly with many existing legacy formats (such as MPO, MTP, MU, MT-RJ, MT-BP, and other standard formats including, but not limited to SFF and SFP formats).

SUMMARY OF THE INVENTION

Embodiments of the invention include an optical connector module (OCM) suitable for receiving an optical ferrule and electrically connecting to an electrical connector. The optical ferrule and electrical connector are configured in accordance with a connector format. The OCM includes a module body that houses an integrated opto-electric assembly and provides electrical and optical connection to existing formats. Such an OCM includes an integrated opto-electric assembly comprising an optical sub-assembly (OSA) and chip sub-assembly (CSA) that are electrically connected to each other and configured as a single opto-electric component. The OCM also includes an optical interface suitable for receiving the ferrule and configured to enable optical communication between optical fibers of the ferrule and the OSA. Additionally, the OCM includes an electrical interface suitable for electrically connecting to the electrical connector and configured to enable electrical communication between the connector and the CSA.

In other embodiments, the OCM can include at least one alignment member suitable for receiving the ferrule in a manner that enables the optical coupling of the ferrule to the optical interface of the OCM so that the ferrule obtains a desired optical alignment with respect to photonic devices arranged on the OSA. OCM can be configured that they are compatible with the industry standard format optical ferrules and configured such that the electrical interface is compatible with industry standard electrical connectors.

The embodiments of the invention further include a method for electrically coupling an opto-electric assembly to a standard connector format. And also optically coupling optical fibers carried by a ferrule to the opto-electric assembly. The method involves providing a ferrule having optical fibers arranged in accordance with a format. The method also involves providing an opto-electric assembly having an integrated opto-electric assembly. The integrated opto-electric assembly comprising an optical sub-assembly (OSA) and a chip sub-assembly (CSA). The OSA having a plurality of photonic devices arranged thereon in accordance with the connector format. The integrated opto-electric assembly such that the CSA and the OSA are electrically connected to each other and configured as a single opto-electric component arranged in a module body. The module body including an optical interface and an electrical interface. The optical interface is in optical communication with the OSA and suitable for receiving the ferrule and optically configured in accordance with the connector format. The electrical interface is in electrical communication with the CSA and is electrically configured in accordance with the connector format. The method further involves electrically interconnecting the electrical interface to an electrical connector compatible with the connector format. And also, urging the ferrule into engagement with the optical interface of the module body so that the plurality of optical fibers are optically coupled with the plurality of photonic devices.

These and other aspects of the present invention are described in greater detail in the detailed description of the drawings set forth herein below.

BRIEF DESCRIPTION OF THE DRAWINGS

The following detailed description will be more readily understood in conjunction with the accompanying drawings, in which.

It is to be understood that, in the drawings, like reference numerals designate like structural elements. Also, it is understood that the depictions in the figures are not necessarily to scale.

DETAILED DESCRIPTION OF THE DRAWINGS

The present invention is described with reference to a few embodiments, as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

National Semiconductor has developed a family of optical connector modules for connecting optical fibers with electro-optic devices. Some examples of such sleeve-based modules are detailed in the U.S. patent application Ser. No. 09/713,367, entitled "Miniature Opto-Electric Transceiver," by Peter Deane, filed on Nov. 14, 2000; U.S. patent application Ser. No. 09/922,358, entitled "Miniature Semiconductor Package For Opto-Electronic Devices," by Nguyen et al., filed on Aug. 3, 2001; and U.S. patent application Ser. No. 09/922,598, entitled "Techniques For Joining An Opto-Electronic Module To A Semiconductor Package," by Nguyen et al., filed on Aug. 3, 2001, and, U.S. patent application Ser. No. 10/165,553, entitled "Optical Sub-Assembly for Opto-Electronic Modules", by Mazotti et al., filed on Jun. 6, 2002, the contents of which are incorporated by reference.

Such illustrations are intended as examples, and are not in any way intended to be limiting. Such modules are used to connect optical fibers to photonic devices and an accompanying electronics. A core component of these (and other) modules are an integrated opto-electric assembly. Such integrated opto-electric assemblies include an optical sub-assembly (OSA) and an electronic or chip sub-assembly (CSA) formed into a single integrated component. The OSA includes the optical components of the integrated opto-electric assembly and supporting electronics. Such optical components can include photonic devices, lenses, alignment features as well as a host of other optical components. The CSA incorporates a number of electronic features into an integrated circuit package. In particular, the CSA includes circuitry for converting electronic signals of the CSA to signals usable by the electronics and photonics of the OSA, and vice versa. The OSA and CSA electrically interconnected such that signals can pass between the CSA and OSA. Moreover, the CSA and OSA are assembled (typically using solder reflow processes) into an integrated opto-electric assembly comprising a single integrated component.

Figure 3A:
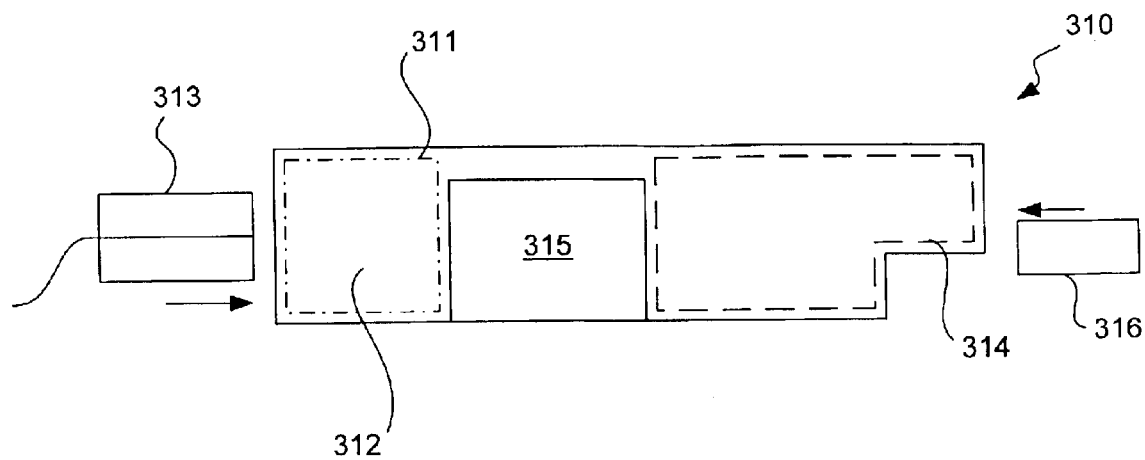
FIG. 3(a) is a block diagram of a generalized embodiment of an optical connector module (OCM) constructed in accordance with the principles of the invention.

A basic embodiment of the present invention is discussed with respect to the block diagram of FIG. 3(a). An optical connector module (OCM) embodiment 310 includes an integrated opto-electronic assembly 315 mounted in a module body 311. The module 310 is configured so that it is compatible with existing connector formats. Such compatibility includes electrical and optical compatibility as well as mechanical compatibility with connector formats. In order to enable such compatibility, the module 310 includes an optical interface 312 (schematically depicted by the dashed-dotted line) and an electrical interface 314 (schematically depicted by the dashed line). For example, the optical interface 312 of the module 310 is configured having a format compatible to receive an optical connector (in this case, an optical ferrule 313) configured in accordance with the same format. Also, the electrical interface 314 of the module 310 is configured having a format compatible to receive an electrical connector 316 configured in accordance with the format.

Figure 1:
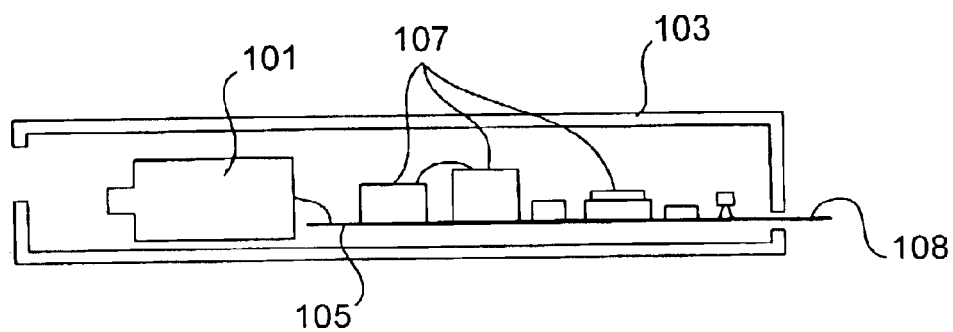
FIG. 1 is a simplified figurative cross-section view of conventional SFP format module.
Figure 2:
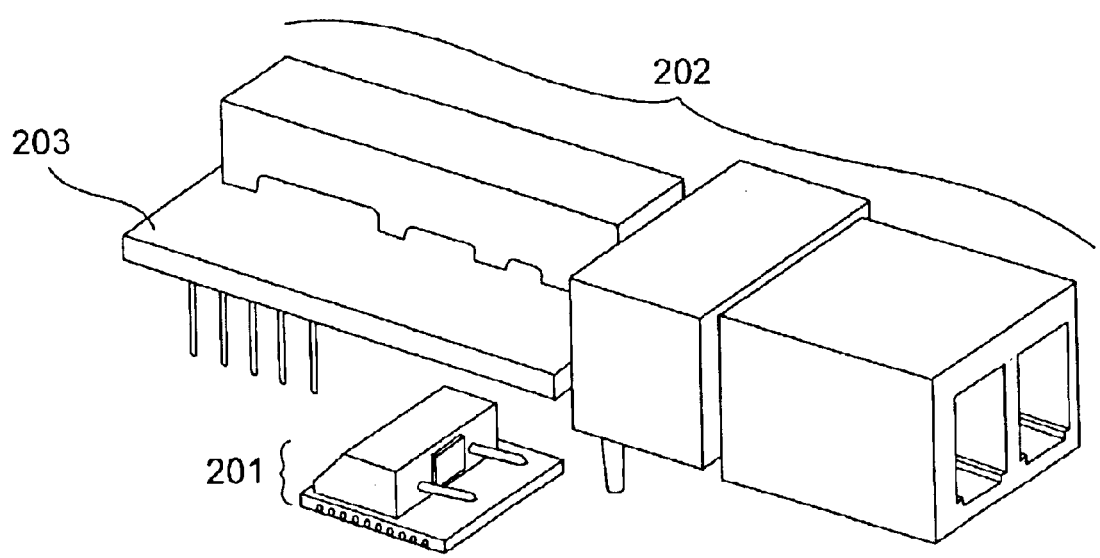
FIG. 2 is a simplified diagram comparing the sizes of a conventional SFF module with an embodiment of an integrated opto-electric assembly embodiment constructed in accordance with the principles of the invention.
Figure 3B:
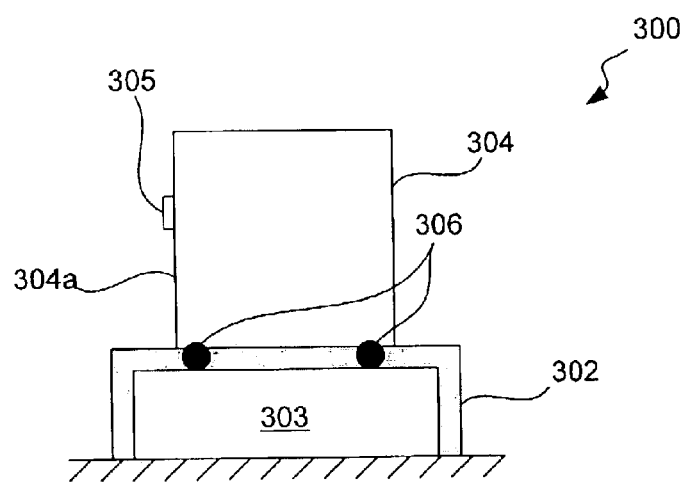
FIG. 3(b) is a depiction of one embodiment of an integrated opto-electric assembly constructed in accordance with the principles of the invention.

Reference to FIG. 3(b) depicts an embodiment of an integrated opto-electric assembly 300 constructed in accordance with the principles of the invention. FIG. 3(b) schematically depicts one such integrated opto-electric assembly 300. The depicted opto-electric assembly 300 is composed of an integrated optical sub-assembly (OSA) 304 and chip sub-assembly (CSA) 302. In typical implementation, an opto-electric assembly 300 is arranged in an OSM body (not shown here). The CSA 302 is electrically connected to the OSA 304 in a single integrated opto-electric component. The CSA 302 and the OSA 304 operate together to translate optical signals to electrical signals and/or vice-versa. The CSA 302 comprises an integrated circuit 303 (or chip) having a variety of electronic circuitry formed thereon. The OSA 304 typically includes a plurality of photonic devices 305 and supporting electronic circuitry formed thereon. The CSA 302 and OSA 304 are electrically interconnected into a single integrated opto-electric assembly 300 capable of receiving optical signals and translating them into electrical signals and vice versa. In the depicted embodiment, photonic devices 305 of the OSA are electrically connected to electronic systems of the CSA 302. Typically, this connection is accomplished using reflow processes that solder the interconnections 306 between the CSA and OSA. Depending on the nature of the photonic devices 305 mounted thereon, the OSA 304 can receive and/or transmit optical signals from and to optical fibers that are in optical communication with the OSA 304. Embodiments of such opto-electric assemblies 300 can also operate in "one-way" configurations, i.e., the opto-electric assembly 300 receives optical signals and translates them into electrical signals or the opto-electric assembly 300 receives electrical signals and translates them into optical signals that can then be transmitted. As can easily be seen in FIG. 2, an embodiment of an opto-electric assembly can be constructed that is considerably smaller that a conventional standard format module. Thus, there is a need for an intermediate module that will enable the opto-electric assembly to be connected with a variety of standard connector formats.

As used herein, photonic devices 305 refer to optical receiver elements or optical emitter elements used to facilitate optical communication to, and from, the OSA 304. Emitter elements are commonly laser devices including, but not limited to LED's, side emitting lasers, VCSEL's, and arrays of such devices. Receiver elements are optical receiver devices configured to receive optical signals. These photonic devices are arranged to optically transmit or receive information carried in optical fibers that interface with connectors holding the photonic devices. In some connector embodiments, the connectors facilitate the connection of a many optical fibers to a plurality of photonic devices. As depicted, commonly the photonic devices form part of an optical sub-assembly (OSA). The OSA is an interface device for translating high-speed electrical data signals into optical data signals (and vice versa). In order to facilitate the optical connection of the OSA to a variety of optical fibers in an optical connector (e.g., a ferrule) arranged accordance with a plurality of formats, the photonic devices on the OSA are sized, shaped, positioned, or otherwise configured in accordance with the format of the fibers in the connector. In one embodiment, an OSA has a supporting wall 304a with photonic devices 305 formed thereon. Such implementations are also referred to as "gravestone" embodiments. Further detail of such implementations are well described in, for example, U.S. patent application Ser. No. 10/165,553, entitled "Optical Sub-Assembly for Opto-Electronic Modules", by Mazotti, et al., filed on Jun. 6, 2002 and U.S. patent application, entitled "Ceramic Optical Sub-Assembly For Opto-Electronic Modules", by Liu et al., filed on Nov. 20, 2001, both of which are incorporated by reference.

With continued reference to FIG. 3(b), the optical sub-assembly 304 is electrically coupled to the semiconductor chip 303 of the CSA 302. The OSA 304 can be used to form optical-electronic implementation for transceiver, transmitter, and receiver applications. Such applications include, but are not limited to, chip-to-chip, board-to-board, chassis-to-chassis, and system-to-system interconnections.

In some embodiments, the CSA's of the invention can be constructed using leadless leadframe packages (LLP). The size of example LLP's are approximately 0.9 mm +/−0.1 mm in height and 7×7, 9×9.5, and 9.5×9.5 mm for the 44 L, 50 L, and 52 L LLP designs, respectively. Such LLP sizes should be thought of as useful examples, but are not intended to limit the scope of the embodiments of the invention. The small form factor of the LLP's allows a high number of the electro-optic packages to be placed next to each other so that a high launch density can be achieved. A high launch density means that a high number of optical devices can be placed within a given amount of space on a printed circuit board. The small size of the miniature form factor of the electro-optic device also allows for a transceiver device to contain multiple lasers and detectors such that a multiple channel transceiver can be formed. By the same token, the launch density can be reduced to accommodate older legacy formats. More detail concerning implementations of integrated opto-electric assemblies can be obtained with reference to, for example, U.S. patent application Ser. No. 09/713,367, entitled "Miniature Opto-Electric Transceiver," by Peter Deane, filed on Nov. 14, 2000 which is incorporated by reference herein.

Figure 4:
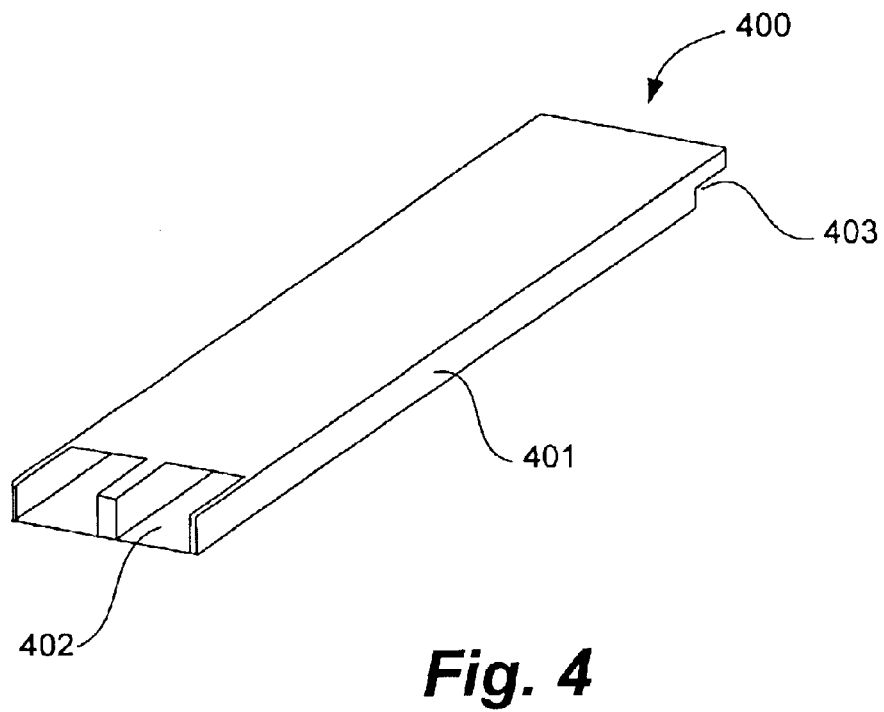
FIG. 4 is perspective view of a ferrule-based small form factor pluggable module embodiment containing an integrated opto-electric assembly constructed in accordance with the principles of the invention.
Figure 5A:
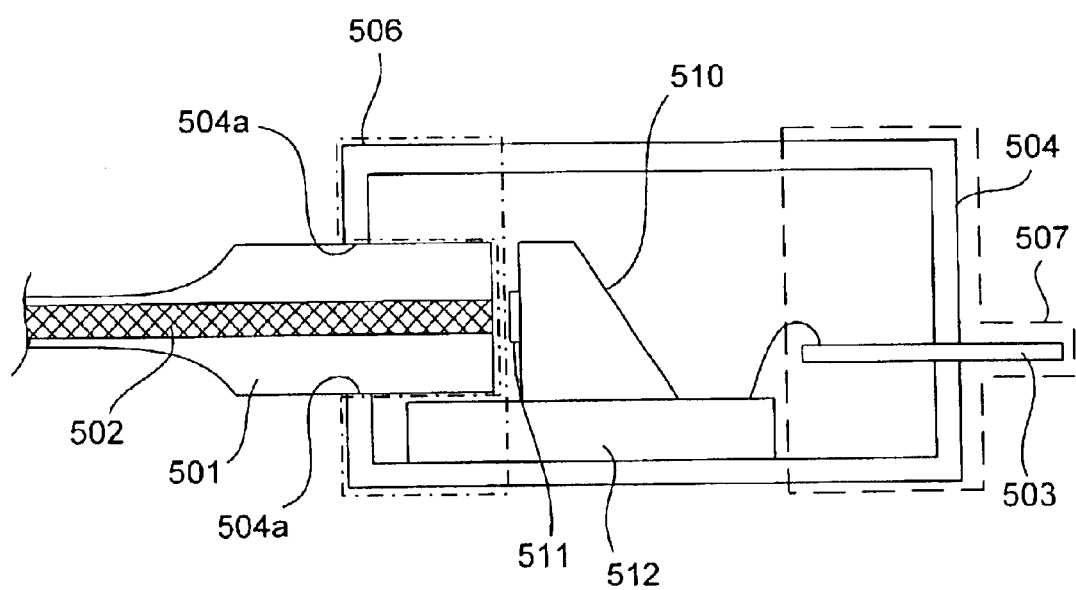
FIG. 5(a) is simplified cross-section view of optical connector module embodiment of the present invention shown engaging a ferrule containing an optical fiber.
Figure 5B:
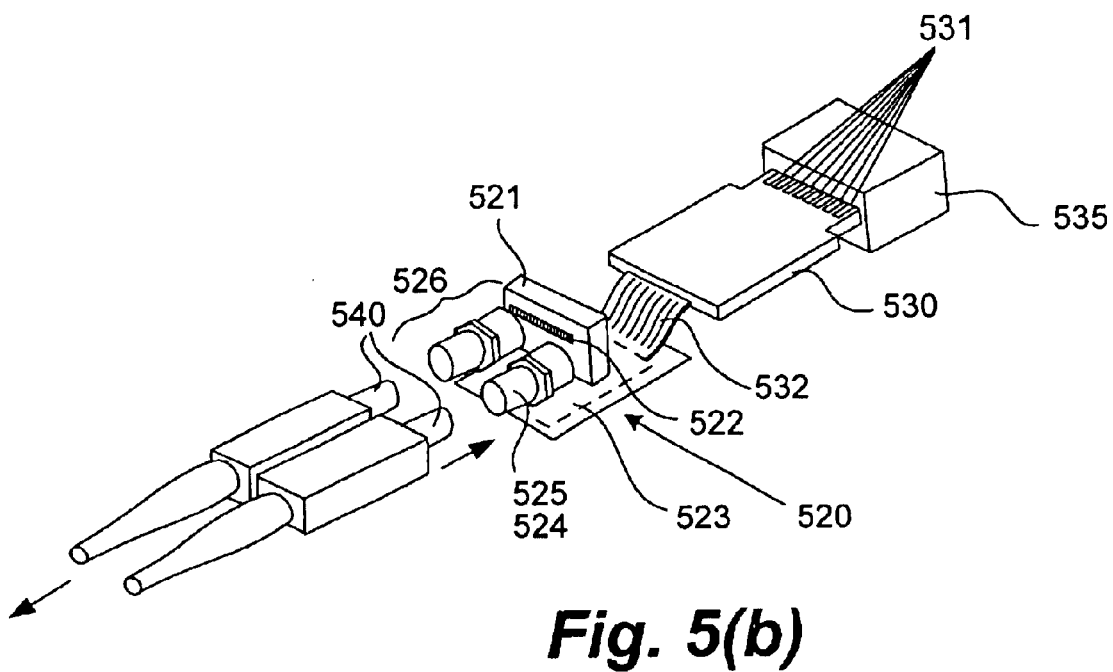
FIG. 5(b) is simplified perspective view of the optical connector module embodiment depicted in FIG. 5(a) with the module body removed to show internal components and showing the engagement of the optical interface with a compatible ferrule in accordance with the principles of the invention.

FIGS. 4, 5(a), and 5(b) depict particular embodiments of the present invention. FIG. 4 figuratively illustrates an optical connector module (OCM) 400 suitable for receiving an optical ferrule configured in accordance with a connector format and electrically connecting to an electrical connection configured in accordance with the connector format. FIG. 4 depicts the module body 401 of the module 400. The module body 401 is suitable for receiving a compatible ferrule (at the optical interface 402) and suitable for electrically connecting (at electrical interface 403) to a compatible electrical connection. The module body 401 of the module 400 is configured so that it is compatible with existing optical ferrules (at optical interface 402). In the depicted embodiment, the module 400 is compatible with the SFP format. For example, an SFP compatible ferrule can be engaged with the module at the optical interface 402 and the module can be plugged into an SFP compatible plug receptacle using the electrical interface 403. Examples, of other formats contemplated for use with the module embodiments of the present invention include, without limitation, MPO, MTP, MU, MT-RJ, MT-BP, SC duplex, LC, and SFF formats, as well as other standard formats.

FIG. 5(a) is a simplified figurative cross section view illustrating an embodiment of the invention. The integrated opto-electric assembly is shown comprising the OSA 510 and CSA 512. The OSA 510 includes photonic devices 511. The opto-electric assembly is mounted in a module body 504. The CSA 512 is electrically connected to an electrical contact 503 that forms part of the electrical interface 507 (schematically depicted with dashed line). A fiber optic ferrule 501 holding an optical fiber 502 is engaged with the module body 504 at the optical interface 506 (schematically depicted with dashed-dotted line) so that the optical fiber 502 is optically aligned with the photonics 511 of the opto-electric assembly. The module body 504 can include an alignment feature 504a that engages the ferrule 501 in a manner that facilitates a desired alignment and spacing between the fiber 502 and the module body 504. The photonic devices 511 can of course be single devices or arrays of devices. Similarly, the optical fiber 502 can be a plurality of optical fibers. In one example, such a plurality can comprise an array of parallel fibers. Although not necessary to practice the invention, embodiments can include alignment features that facilitate the engagement of the optical ferrules 501 with the photonic devices 511. In the depicted embodiment, the alignment features 504a are included as part of the module body 504. In other implementations, alignment feature can be incorporated as part of the optical interface 506.

FIG. 5(b) is a figurative depiction of the internal components of the depicted module 400 (of FIG. 4), with the module body removed. The components include, an integrated opto-electric assembly 520 with an optical sub-assembly (OSA) 521 and a chip sub-assembly (CSA) 523 arranged in the module body. Also included are an electrical interface 530 and an optical interface 526. In some embodiments, alignment features can be added to the module to facilitate the alignment of the ferrules 540 with the photonic devices 522 of the OSA 521. In the depicted embodiment, alignment features forming part of the optical interface 526 are used to facilitate the engagement of the optical ferrules 540 with the photonic devices of the OSA.

FIG. 5(b) depicts an embodiment of an electrical interface 530 configured for connection with an electrical connector 535 of a specified format. The electrical interface 530 is electrically connected 532 to the CSA 523. Here, the electrical interface 530 is electrically coupled 532 to the CSA 523 using a conducting flex interconnect. As is known to persons having ordinary skill in the art many other conducting interconnects can be used. As depicted here, the electrical interface 530 is configured in a pluggable format having a plurality of edge connectors 531 configured in accordance with a specified connector format. The inventors contemplate that the electrical interface 530 can be arranged in a number of different formats for electrical connection to a variety of corresponding connections. Such formats can be different pluggable formats, or solderable connections, or other formats.

Still referring to the embodiment of FIG. 5(b), a fine alignment member 524 is included in the optical interface 526 of the module. Member 524 is a specific example of a wider more generalized concept of providing optical mechanical fine alignment feature(s) that facilitate the fine alignment of the optical fibers with the photonic devices 522 as the ferrules 540 are engaged with the module. In the depicted implementation, the alignment member 524 (i.e., the "barrels" 525) can be constructed in a precision molding process or by other suitable means. In use, as the ferrule(s) 540 are urged into engagement with module, the outer portions of the alignment member 524 (i.e., the "barrels" 525) engage with complementary portions of the ferrules 540 as the ferrules 540 are engaged with the module. The barrels 525 can operate as a fine alignment feature that facilitates correct optical alignment between the ferrule 540 and photonic devices 522 of the OSA. Such fine alignment positions the optical fibers at a desired angle and distance from the photonic devices 522. As is readily apparent to those having ordinary skill in the art, many different implementations can be used to implement the fine alignment features of the embodiments of the invention. An additional feature of the depicted alignment member 524 is that the member 524 can include optical elements for facilitation of optical communication between the photonic devices 522 and the fibers of ferrules 540. Such optical elements can include, but are not limited to lenses, filters, gratings, collimators, mirrors, etalons, and the like. Such elements can, for example, be mounted with the barrels 525. In other embodiments, the optical elements can be mounted with elsewhere such that light passing between the photonic devices 522 and the optical fibers (e.g., held by the ferrules 540) passes through the optical elements.

Additionally, the aforementioned fine alignment feature can also be used cooperatively with coarse alignment features to establish proper engagement of the ferrules with the module. Typically, the coarse alignment feature forms part of the optical interface of the module. Other modes of such coarse alignment are depicted in FIG. 5(a) (e.g., 504a) and elsewhere in the specification. Generally, the coarse alignment feature provides a general alignment of the ferrule with the module during engagement. As the ferrule is further engaged, the fine alignment feature provides accurate positioning of the optical fibers relative to associated photonic devices mounted in the module.

Figure 6:
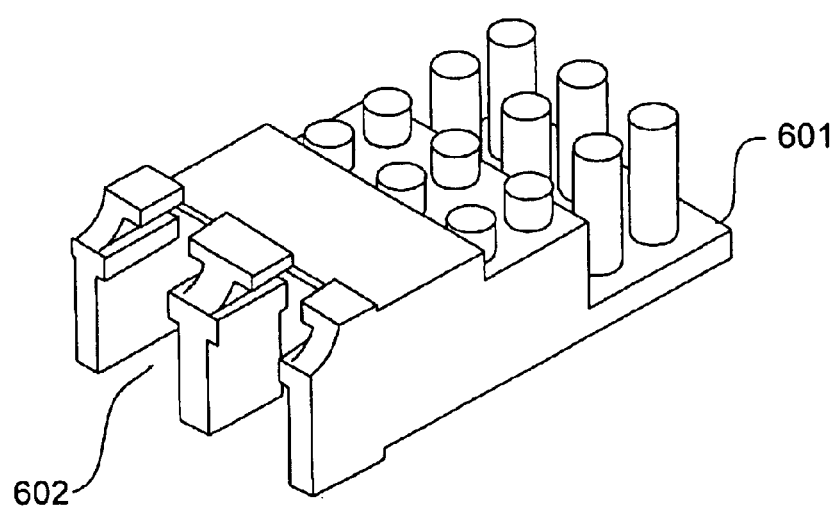
FIG. 6 is a simplified perspective view of an embodiment of a heat sink using in accordance with the principles of the invention.

The inventors note, that in some embodiments, the module body can incorporate a heat sink to prevent excessive heating in the CSA. In other embodiments, a separate heat sink component can be added that makes better thermal contact between the CSA and the module body to transfer heat from the CSA to the module body. FIG. 6 depicts one such heat sink embodiment 601 that can be used with the embodiment depicted in FIG. 5(b). The heat sink 601 is fitted over the OSA 521 and CSA 523 thereby facilitating thermal communication between the CSA and the module body (e.g., 504 of FIG. 5(a)), thereby facilitating heat transfer away from the CSA. Additionally, this embodiment of the heat sink 601 can include coarse alignment features 602 designed to facilitate coarse alignment of the ferrules with the module body as the ferrules are engaged with the module. A fine alignment capability can also be provided by incorporating other fine alignment features (e.g., 524 of FIG. 5(b)).

The forgoing OCM embodiments depict one or two fiber implementations and formats. The inventors contemplate OCM embodiments of the present invention that are compatible with a wide variety of other connector formats. In particular, formats implementing multi-fiber applications, such as parallel multi-mode fiber arrays, are specifically contemplated. Multiple fibers held in a ferrule can be connected to an array of photonic devices of an OSA to interconnect the fibers to multi-fiber transceivers, emitters, or receivers. For example, a twelve-fiber array ferrule can be connected to a OCM embodiment that includes photonic devices configured as an array of four emitter devices, four receiver devices, and four dark fibers to form a transceiver implementation. In another alternative embodiment, one ferrule can contain an array of twelve fibers configured to connect with an array of twelve emitters to form a pure transmitter. Another ferrule can contain an array of twelve fibers configured to connect with an array of twelve receivers forming a pure receiver. In still another embodiment the OCM can include the aforementioned pure emitter and pure receiver in the same module, forming a transceiver module capable of handling twelve incoming channels and twelve outgoing channels. As is known to persons having ordinary skill in the art, the OCM's of the present invention can be configured in a number of other alternative configurations.

Specifically contemplated formats include, but are not limited to standard connector formats. Such formats include, without limitation, SFF, SFP, MTP, MPO, MU, MT-RJ, MT-BP, SC duplex, LC, formats as well as other connector formats in common usage.

Figure 7A:
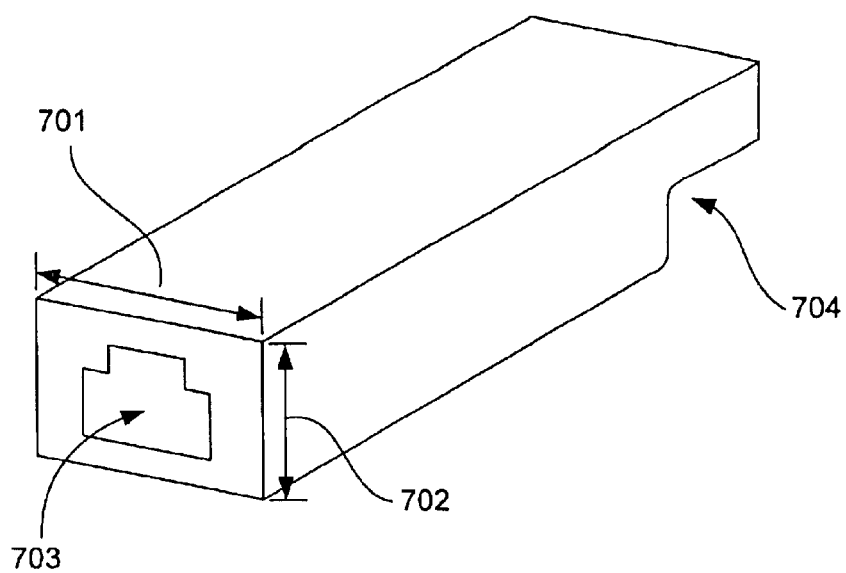
FIG. 7(a) is simplified figurative perspective view of an embodiment of an optical connector module compatible with the SFP format.
Figure 7B:
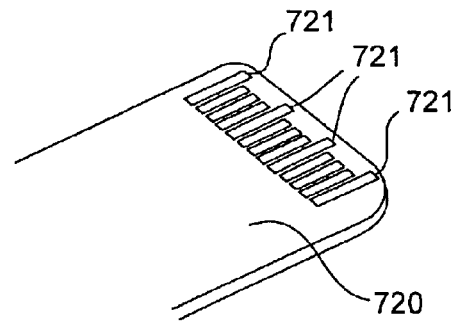
FIG. 7(b) is a simplified figurative view of a portion of an embodiment of a pluggable electrical interface compatible with the SFP format in accordance with the principles of the invention.

One example is the Small Form Factor Pluggable (SFP) format. The SFP format is configured as specified by the Multi-Source Agreement (MSA) as contained in the Cooperation Agreement for Small Form-Factor Pluggable Transceivers and other related agreements that form such industry standards. The electrical and optical standards are compatible with appropriate standards (for example, those enumerated in IEEE 802.3 z standard or the ITU G.957 Synchronous Digital Hierarchy standard as well as other standards). In general such standards are also compatible with duplex LC, MT-RJ, and SC connectors. Such formats are well known to persons having ordinary skill in the art. One example of a SFP compatible device is a SFP transceiver. A simplified figurative depiction of such a transceiver module is depicted in FIG. 7(a). Such modules are generally about 13.7 mm thick 701 and about 9 mm tall 702. The optical interface for receiving the ferrule 703 is about 6.3 mm thick 701 and about 8.6 mm tall. The optical interface is configured to receive two optical fibers in an LC format. At the electrical interface 704 an electrical contact 720 is configured as in FIG. 7(b). The electrical contact 720 is about 13.4 mm wide and includes ten edge connectors 721. The edge connectors 721 are about 1 mm wide having a pitch of about 0.8 mm.

Figure 7C:
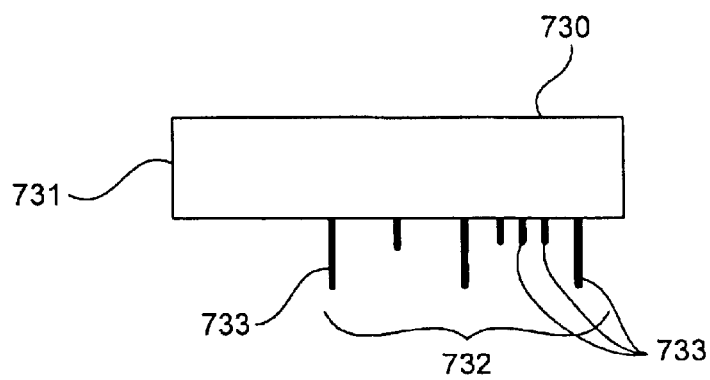
FIG. 7(c) is a simplified figurative view of an embodiment of an SFF compatible module including a plurality of solderable electrical connections formed a portion of the electrical interface in accordance with the principles of the invention.

Another closely related format is the Small Form Factor (SFF) connector format. SFF connectors have the same optical interface as SFP, but the electrical interface 732 includes a plurality of solderable electrical connections instead of a pluggable electrical connection. FIG. 7(c) depicts one such implementation of a SFF module. The module 730 includes an optical interface 731 for receiving a ferrule configured in accordance with the SFF standard. The optical interface 731 is configured much the same as in FIG. 7(a). Additionally, the layout of the solderable connections 733 of the electrical interface 732 is configured in compliance with the SFF electrical connector standard. The depicted connections 733 are electrically connected to a mated set of electrical connectors on the device to which the module 730 is to be connected. Commonly this is accomplished by soldering the connections together.

Another standard ferrule based parallel multi-mode fiber format is a MT ferrule-based connector using multi-fiber push-on MT ferrules. An MT connector is a small form factor connector that permits high-density fiber solutions using US Conec MT ferrules. This ferrule format is also used in MPO (multiple parallel optics) format. Generally, twelve or more fibers per connector are bundled together in a small diameter cable that is connected to an optical interface. Some examples of common fiber counts used in this standard are 12, 24, 36, 48, 72, 96, and 144 fiber implementations. This well-known format also includes a characteristic electrical interface as part of the standard. Additional detail of such a standard format can be found in the U.S. Pat. No. 5,917,976 to Yamaguchi, entitled "Optical Transmission Path Coupling Method And Optical Transmission Path Coupling Apparatus As Well As Optical Axis Self-Alignment Tool" issued on Jun. 29, 1999.

In order to interface an opto-electronic assembly of the present invention with such a format, the OSA is configured having photonic devices arranged in an MPO compatible format. The OCM is sized so that it matches the configuration parameters for the standard. Also, the optical interface is configured to match the optical configuration format for the MPO standard. Moreover, the electrical interface is configured to match the electrical configuration format for the MPO standard.

Figure 8:
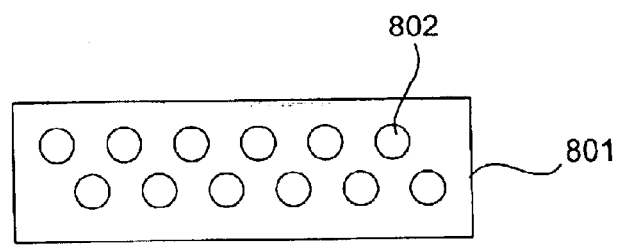
FIG. 8 is a facing view of a portion of a module embodiment configured to accommodate fibers arranged in a staggered format.

Modules and opto-electronic assemblies of the present invention can be configured to receive optical fibers arranged in virtually any format. Any M×N array of fibers can be accommodated by embodiments of the invention. Additionally, a module can be configured to accommodate fibers arranged in a staggered format. One such format is depicted in FIG. 8. A photonic element 801 including a staggered array of photonic devices 802 is shown. In the depicted implementation, the photonic element comprises an emitter array comprising twelve VCSEL's. Such configurations are desirable because they increase the launch density.

Figure 9A:
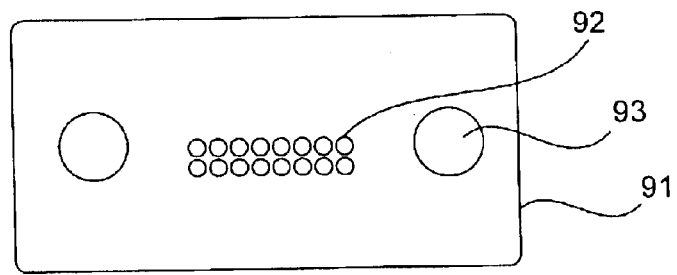
FIGS. 9(a)–9(d) are facing views of a variety of standard format plug connectors.
Figure 9B:
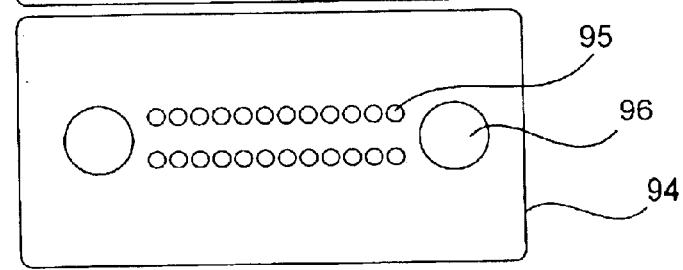
Figure 9C:
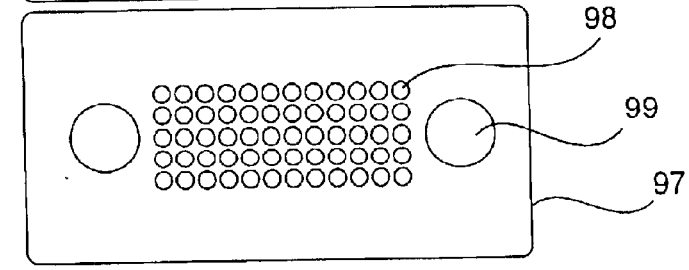
Figure 9D:
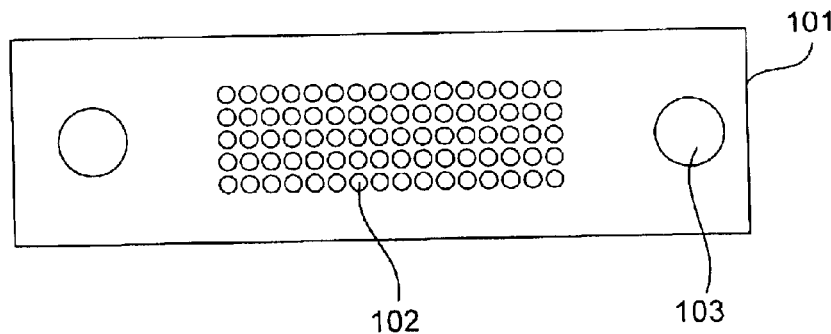

The embodiments of the invention can be configured to accommodate a variety of other formats. For example, another commonly used format is the MT-RJ format. The MT-RJ format is a small form factor, dual fiber connector commonly used and well known to those in the art. The MT-RJ format is a high fiber count fiber connector (sometimes having as many as eighty fibers). Other commonly used formats are the MU format and the MT-BP format. In addition to the few formats described above, there is a relatively wide range of other standard ferrule-based parallel multi-mode fiber formats in common usage. As previously discussed, many formats including, but not limited to, parallel multi-mode fiber formats can be used in accordance with the principles of the invention. By way of example, FIGS. 9(a)–9(d) illustrate four of the many possible standard configurations implementable in accordance with the principles of the invention. FIG. 9(a) shows a "16MT" connector 91 format having sixteen fibers 92 arranged in an eight by two fiber array. Such an array has a pitch of 0.25 mm between rows and columns. Also shown are the holes 93 for receiving the alignment pins from the connector plug. FIG. 9(b) shows a "24MT" connector 94 format having twenty-four fibers 95 arranged in a twelve column by two row fiber array. Such an array has a pitch of 0.25 mm between columns and a 0.5 mm pitch between columns. Also shown are the holes 96 for receiving the alignment pins from the connector plug. FIG. 9(c) shows a "60MT" connector 97 format having sixty fibers 98 arranged in a twelve column by five row fiber array. Such an array has a pitch of 0.25 mm between rows and columns. Also shown are the holes 99 for receiving the alignment pins from the connector plug. FIG. 9(d) shows an "80MT" connector 101 format having eighty fibers 102 arranged in a sixteen column by five row fiber array. Such an array has a pitch of 0.25 mm between rows and columns. Also shown are the holes 103 for receiving alignment pins from a connector plug. These are just a few of the many possible standard formats usable in accordance with the principles of the present invention.

It is specifically pointed out that the present invention can be applied to other standard format implementations not specifically mentioned, as well as many other non-standard format implementations.

The present invention has been particularly shown and described with respect to certain preferred embodiments and specific features thereof. However, it should be noted-that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. In particular, embodiments of the invention can be used to construct connector modules having an integrated opto-electric assembly so that they are electrically and optically compatible with MPO, MTP, MT-RJ, MT-BP, MU, SFP, SFF, SC, LC, or other standard formats. Other embodiments and variations to the depicted embodiments will be apparent to those skilled in the art and may be made without departing from the spirit and scope of the invention as defined in the following claims. Further, reference in the claims to an element in the singular is not intended to mean "one and only one" unless explicitly stated, but rather, "one or more".

What is claimed is:

1. An optical connector module (OCM) suitable for receiving a standard format optical ferrule configured in accordance with a standard optical connector format and suitable for electrically connecting with an electrical connector configured in accordance with a standard electrical connector format, the module comprising:

a module body including:

a miniature form factor integrated opto-electric assembly comprising an optical sub-assembly (OSA) and chip sub-assembly (CSA) that are electrically connected to each other and configured as a single opto-electric component;

wherein the OSA includes photonic devices arranged on the OSA in accordance with a standard optical connector format;

an optical interface suitable for receiving and reversibly engaging the standard format optical ferrule and configured to enable optical communication between optical fibers of the ferrule and the OSA of the miniature form factor integrated opto-electric assembly wherein the optical interface is configured to receive and align optical fibers of the standard format optical ferrule with the photonic devices arranged on the OSA;

an electrical interface for electrically connecting to the electrical connector and configured to enable electrical communication between the electrical connector and the CSA of the miniature form factor integrated opto-electric assembly wherein electrical connections of the electrical interface are configured in accordance with said standard electrical connector format; and wherein the module includes an alignment member suitable for receiving the optical ferrule and configured to optically couple the ferrule to the OSA so that the optical fibers held by the ferrule obtain a desired optical alignment with respect to the photonic devices arranged on the OSA, the alignment member including a fine alignment feature that facilitates a fine alignment of the ferrule with the OSA as the ferrule is urged into engagement with the optical connector module and including a coarse alignment feature which together with the fine alignment feature facilitates the alignment of the ferrule with the OSA as the ferrule is urged into engagement with the module.

2. The module of claim 1 further including optical elements configured to facilitate the optical coupling of the optical fibers held by the ferrule to the photonic devices of the OSA so that the fibers obtain a desired optical alignment with respect to the photonic devices arranged on the OSA.

3. The module of claim 1 wherein the alignment member includes optical elements configured to facilitate the optical coupling of the optical fibers held by the ferrule to the photonic devices of the OSA so that the fibers obtain a desired optical alignment with respect to the photonic devices arranged on the OSA.

4. The module of claim 1 wherein the module body is shaped and sized to receive and the standard format optical ferrule.

5. The module of claim 4 wherein the standard format optical ferrule is a selected from among formats consisting of SFP (small form factor pluggable), SFF (small form factor), SC, LC, MTP, MPO, MU, MT-RJ, and MT-BP formats.

6. The module of claim 5 wherein the ferrule and optical fibers held by the ferrule are arranged in accordance with the small form factor (SFF) format and wherein the module body and the optical interface are arranged to receive the SFF format ferrule and wherein the photonic devices arranged on the OSA conform to the SFF format and wherein the electrical interface and the module body are configured in accordance with the SFF format.

7. The module of claim 5 wherein the ferrule and optical fibers held by the ferrule are arranged in accordance with the small form factor pluggable (SFP) format and wherein the module body and the optical interface are arranged to receive the SFP format ferrule and wherein the photonic devices arranged on the OSA conform to the SFP format and wherein the electrical interface and the module body are configured in accordance with the SFP format.

8. The module of claim 5 wherein the ferrule and optical fibers held by the ferrule are arranged in accordance with a connector format selected from among formats consisting of SFP, SFF, SC, LC, MTP, MPO, MU, MT-RJ, and MT-BP formats and wherein the module body and the optical interface are arranged to receive the ferrule having the selected format and wherein the photonic devices arranged on the OSA conform to the same selected and wherein the electrical interface and the module body are configured in accordance with the selected format.

9. A module as in claim 1 wherein the photonic devices are arranged on the OSA in accordance with a standard connector format selected from among formats consisting of SFP, SFF, MTP, MPO, SC, LC, MU, MT-RJ, and MT-BP formats.

10. The module of claim 1 wherein the photonic devices include at least one of an optical emitter element and an optical receiver element.

11. The module of claim 10 wherein the optical emitter element can be selected from among the group of LED's, side emitting lasers, VCSEL's, LED arrays, side emitting laser arrays, and VCSEL arrays.

12. The module of claim 10 wherein the OSA comprises a transceiver including both an optical emitter element and an optical receiver element.

13. The module of claim 12 wherein the transceiver includes a single optical emitter and a single optical receiver.

14. The module of claim 12 wherein the OSA comprises a transceiver includes an optical emitter array and an optical receiver array.

15. The module of claim 1 wherein the standard electrical connector format is selected from among formats consisting of SFP, SFF, MTP, MPO, MU, SC, LC, MT-RJ, and MT-BP formats.

16. The module of claim 1 wherein the electrical interface conforms to the small form factor industry standard (SFF).

17. The module of claim 1 wherein the electrical interface conforms to the pluggable small form factor industry standard (SFP).

18. An optical connector module (OCM) suitable for receiving a standard format optical ferrule configured in accordance with a standard optical connector format and suitable for electrically connecting with an electrical connector configured in accordance with a standard electrical connector format, the module comprising:

a module body including:
a miniature form factor integrated onto-electric assembly comprising an optical sub-assembly (OSA) and chip sub-assembly (CSA) that are electrically connected to each other and configured as a single opto-electric component wherein the OSA includes photonic devices arranged in accordance with a standard optical connector format;

an optical interface suitable for receiving and reversibly engaging the standard format optical ferrule and configured to receive and align optical fibers of the standard format optical ferrule with the photonic devices arranged on the OSA enabling optical communication between optical fibers of the ferrule and the OSA of the miniature form factor integrated onto-electric assembly; and an electrical interface suitable for electrically connecting to the electrical connector and configured to enable electrical communication between the electrical connector and the CSA of the miniature form factor integrated opto-electric assembly wherein the electrical connections of the electrical interface are configured in accordance with said standard electrical connector format and wherein the electrical interface is electrically connected to the CSA using a wire ribbon.

19. An optical connector module (OCM) suitable for receiving a standard format optical ferrule configured in accordance with a standard optical connector format and suitable for electrically connecting with an electrical connector configured in accordance with a standard electrical connector format, the module comprising:
 a module body including:
  a miniature form factor integrated opto-electric assembly comprising an optical sub-assembly (OSA) and chip sub-assembly (CSA) that are electrically connected to each other and configured as a single opto-electric component wherein the OSA includes photonic devices arranged on the OSA in accordance with a standard optical connector format;
  an optical interface suitable for receiving and reversibly engaging the standard format optical ferrule and thereby receive and align optical fibers of the standard format optical ferrule with the photonic devices arranged on the OSA enabling optical communication between optical fibers of the ferrule and the OSA of the miniature form factor integrated opto-electric assembly;
  an electrical interface suitable for electrically connecting to the electrical connector and configured to enable electrical communication between the electrical connector and the CSA wherein electrical connections of the CSA are electrically connected with electrical connections of the electrical interface that are configured in accordance with said standard electrical connector format;
  wherein the module includes an alignment member suitable for receiving the optical ferrule and configured to optically couple the ferrule to the OSA so that the optical fibers held by the ferrule obtain a desired optical alignment with respect to the photonic devices arranged on the OSA; and
  wherein the module body includes a coarse alignment feature that facilitates coarse alignment of the ferrule with the OSA as the ferrule is urged into engagement with the optical interface of the module.

20. A module as in claim 19 wherein the coarse alignment feature includes a heat sink in thermal communication with the opto-electric assembly and the module body such that heat can be transferred from the opto-electric assembly to the body for dissipation.

21. An optical connector module (OCM) suitable for receiving a standard format optical ferrule configured in accordance with a standard optical connector format and suitable for electrically connecting with an electrical connector configured in accordance with a standard electrical connector format, the module comprising:
 a module body including:
  a miniature form factor integrated opto-electric assembly comprising an optical sub-assembly (OSA) and chip sub-assembly (CSA) that are electrically connected to each other and configured as a single opto-electric component wherein the OSA includes photonic devices arranged on the OSA in accordance with a standard optical connector format;
  an optical interface suitable for receiving and reversibly engaging the standard format optical ferrule and thereby receive and align optical fibers of the standard format optical ferrule with the photonic devices arranged on the OSA enabling optical communication between optical fibers of the ferrule and the OSA of the miniature form factor integrated opto-electric assembly;
  an electrical interface suitable for electrically connecting to the electrical connector and configured to enable electrical communication between the electrical connector and the CSA wherein electrical connections of the CSA are electrically connected with electrical connections of the electrical interface that are configured in accordance with said standard electrical connector format;
  wherein the module includes an alignment member suitable for receiving the optical ferrule and configured to optically couple the ferrule to the OSA so that the optical fibers held by the ferrule obtain a desired optical alignment with respect to the photonic devices arranged on the OSA; and
  wherein the module includes a heat sink in thermal communication with the opto-electric assembly and the module body such that heat can be transferred from the opto-electric assembly to the body for dissipation.

22. A method for optically coupling optical fibers held by a standard format optical ferrule to a miniature form factor integrated opto-electric assembly comprising an optical sub-assembly (OSA) and chip sub-assembly (CSA) that are electrically connected to each other and configured as a single miniature form factor opto-electric component, the method comprising:
 providing a ferrule that holds a plurality of optical fibers arranged in accordance with a standard optical connector format;
 providing an opto-electric assembly that includes an integrated opto-electric assembly comprising a miniature form factor optical sub-assembly (OSA) having a plurality of photonic devices arranged thereon in accordance with the standard optical connector format and chip sub-assembly (CSA) that are electrically connected to each other and configured as a single miniature form factor opto-electric component arranged in a module body, the module body including an optical interface and an electrical interface, the optical interface in optical communication with the OSA and suitable for receiving the ferrule and optically configured in accordance with the standard optical connector format, the electrical interface in electrical communication with the CSA and electrically configured in accordance with a standard electrical connector format;
 electrically interconnecting the electrical interface to an electrical connector compatible with the standard electrical connector format;
 urging the ferrule into engagement with the optical interface of the module body so that the plurality of optical fibers are optically coupled with the plurality of photonic devices wherein urging the ferrule into engagement with the optical interface comprises:
 coarsely aligning the ferrule with the plurality of photonic devices; and
 finely aligning the ferrule with the plurality of photonic devices so that the plurality of optical fibers are optically coupled with the plurality of photonic devices.

23. A method as in claim 22, wherein the standard optical connector format comprises the SFF format.

24. A method as in claim 22, wherein the standard optical connector format comprises the SFP format.

25. A method as in claim 22, wherein the standard optical connector format is selected from among the group of formats consisting of MPO, MTP, SC, LC, MT-RJ, MT-BP, SFP, and SFF formats.

* * * * *